United States Patent [19]

Hansen

[11] Patent Number: 5,737,065
[45] Date of Patent: Apr. 7, 1998

[54] DUAL LIGHT SOURCE TRANSILLUMINATOR AND METHOD OF TRANSILLUMINATION

[75] Inventor: Michael E. Hansen, Waukesha, Wis.

[73] Assignee: Fotodyne Incorporated, Hartland, Wis.

[21] Appl. No.: 443,249

[22] Filed: May 17, 1995

[51] Int. Cl.⁶ ................................................ G03B 27/04
[52] U.S. Cl. ................................................ 355/113
[58] Field of Search ............................... 355/67, 70, 113; 362/84, 97, 98

[56] References Cited

U.S. PATENT DOCUMENTS

| | | | |
|---|---|---|---|
| 2,117,754 | 5/1938 | Bell | 88/24 |
| 2,725,461 | 11/1955 | Amour | 240/1.1 |
| 3,591,283 | 7/1971 | Peisach | 355/67 |
| 3,682,551 | 8/1972 | Bradley et al. | 355/120 |
| 4,266,164 | 5/1981 | Schroeder | 362/98 X |
| 4,469,102 | 9/1984 | Fish | 128/395 |
| 4,561,044 | 12/1985 | Ogura et al. | 362/84 |
| 4,657,655 | 4/1987 | Smoot et al. | 204/299 R |
| 4,712,014 | 12/1987 | Eich | 250/494.1 |
| 5,175,437 | 12/1992 | Waluszko | 250/504 R |
| 5,327,195 | 7/1994 | Ehr | 355/113 |
| 5,387,801 | 2/1995 | Gonzalez et al. | 250/504 R |

OTHER PUBLICATIONS

Fotodyne Incorporated; 1993–1994 Catalog–Molecular Biology Products; p. 24.

Primary Examiner—Fred L. Braun
Attorney, Agent, or Firm—Michael, Best & Friedrich LLP

[57] ABSTRACT

A transilluminator having a housing having therein a window, a first light source supported within the housing for transmitting light through the window and illuminating a sample adjacent the window, and a second light source which is mounted outside the housing and which is movable between a first position wherein the second light source is removed from the window, and a second position wherein the second light source is over the window for transmitting light onto a sample adjacent the second light source.

27 Claims, 2 Drawing Sheets

DUAL LIGHT SOURCE TRANSILLUMINATOR AND METHOD OF TRANSILLUMINATION

BACKGROUND OF THE INVENTION

This invention relates to a dual light source transilluminator used for visualizing DNA in agarose gels as well as for other laboratory applications.

A common method for separating, identifying, or purifying DNA from a mixed sample is by electrophoresis of the sample through an agarose gel. The electrophoretic migration rate of DNA through agarose gel is dependent upon the molecular weight of the DNA, as well as such considerations as the agarose concentration and the strength of the electric field. The electrophoresis technique is simple and rapid, and results in the formation of distinct bands of DNA within the gel.

After electrophoresis for a sufficient period, electrophoresis gels are typically stained to visualize the bands of DNA, often with low concentrations of the fluorescent dye ethidium bromide. Ethidium bromide, which becomes bound-up, or intercalated, between bases of the DNA, has an increased fluorescent yield, as compared to free ethidium bromide in solution. Ultraviolet (UV) radiation is absorbed by bound ethidium bromide dye and re-emitted in the red-orange region of the visible spectrum. Thus, the location and relative amount of DNA is detectable by direct examination of an ethidium bromide- stained electrophoresis gel under illumination by ultraviolet light.

One apparatus used to illuminate electrophoresis gels produces ultraviolet light in an enclosed housing. A light source within the housing transmits UV light through a horizontal window provided in the top of the housing. A gel is positioned over the window for illumination by the UV light, which passes through the gel from the window below. Such an apparatus is referred to as a transilluminator, and is described in U.S. Pat. No. 4,657,655. The window of the transilluminator typically comprises a purple filter glass centered directly over the UV light source. This filter glass blocks all light except that within a narrow range centered around the specific UV region which causes the fluorescence of ethidium bromide bound to DNA. Additionally, a UV-blocking cover, transparent to visible light, is often provided which is mounted to the housing and prevents the UV light from penetrating the cover, thereby protecting a user from exposure to harmful UV radiation.

Dual transilluminators, which include two or more light sources in the housing, are also known in the art. One configuration includes a UV light source and a white light source located side by side within a housing having two windows. The UV light source illuminates a sample located on one window, and the white light source illuminates a sample located upon the other window. White light sources are useful in illuminating white light images such as coomassie or silver stained protein gels.

Another known configuration for a transilluminator includes a plurality of UV light sources having various wavelengths located within the housing. Such an arrangement may be used to illuminate samples at the various wavelengths of the UV light sources, and is described in U.S. Pat. No. 5,175,437.

SUMMARY OF THE INVENTION

This invention provides a dual light source transilluminator wherein a first light source is located within the housing, and a second light source is mounted outside the housing and is movable with respect to the housing. The second light source is preferably a white light source in the form of a thin plate or panel movable to a position in which the panel overlies the conventional UV window. The panel preferably pivots relative to the housing.

An electroluminescent (EL) lamp, which can be configured as a thin, lightweight panel, may be used as the second light source. EL lamps are devices that convert electrical energy into light, or luminescence. By applying an AC voltage to a phosphor and insulation layer sandwiched between two electrodes, the electric field causes the phosphor to charge and discharge, resulting in the emission of photons during each cycle. The intensity of the light emitted from the EL lamp depends on the magnitude and frequency of the applied voltage, with standard operating parameters of 115 V at 400 Hz.

The color of light emitted by the EL lamp depends on various factors, and may be customized. The primary lamp color is determined by the type of phosphor in the lamp. Blending multiple phosphors, adding fluorescent dyes, or adding a color filter to the lamp changes the light color emitted by the lamp.

Typically, EL lamps have been utilized for the backlighting of liquid crystal displays. However, the advantages of EL lamp technology also make the lamps useful as light sources in transilluminators. Thin and lightweight, these lamps may be configured in a variety of panel shapes including rectangular. Another advantage is evenness of illumination, with a typical variance in illumination of less than 10% across the panel. An EL lamp also emits light without heat, so that the panel remains cool and illuminated samples are not adversely affected by heat.

The frequency of operation of the EL lamp, typically 400 Hz, means less noise interference with line frequency. Also, the light does not flicker, as may be the case with fluorescent light sources.

An advantage of this configuration is it occupies less space compared to the traditional side by side dual transilluminator. Additionally, such a construction is more economical to manufacture and easy to use.

The invention also provides a method of transilluminating a laboratory sample. The method involves using an EL light panel as a stand-alone transilluminator.

Other features and advantages of the invention will become apparent to those skilled in the art upon review of the following detailed description, claims and drawings.

Figure 1:
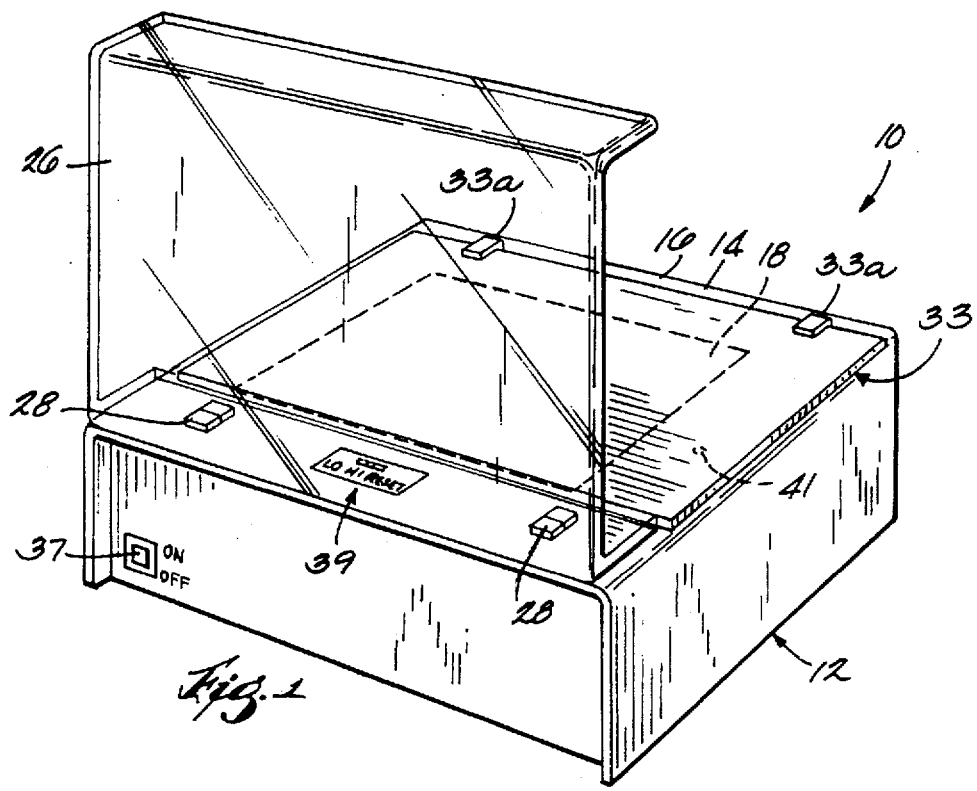
Fig. 1 is a perspective view of a dual transilluminator embodying the invention with the white light panel in its lowered position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 2:
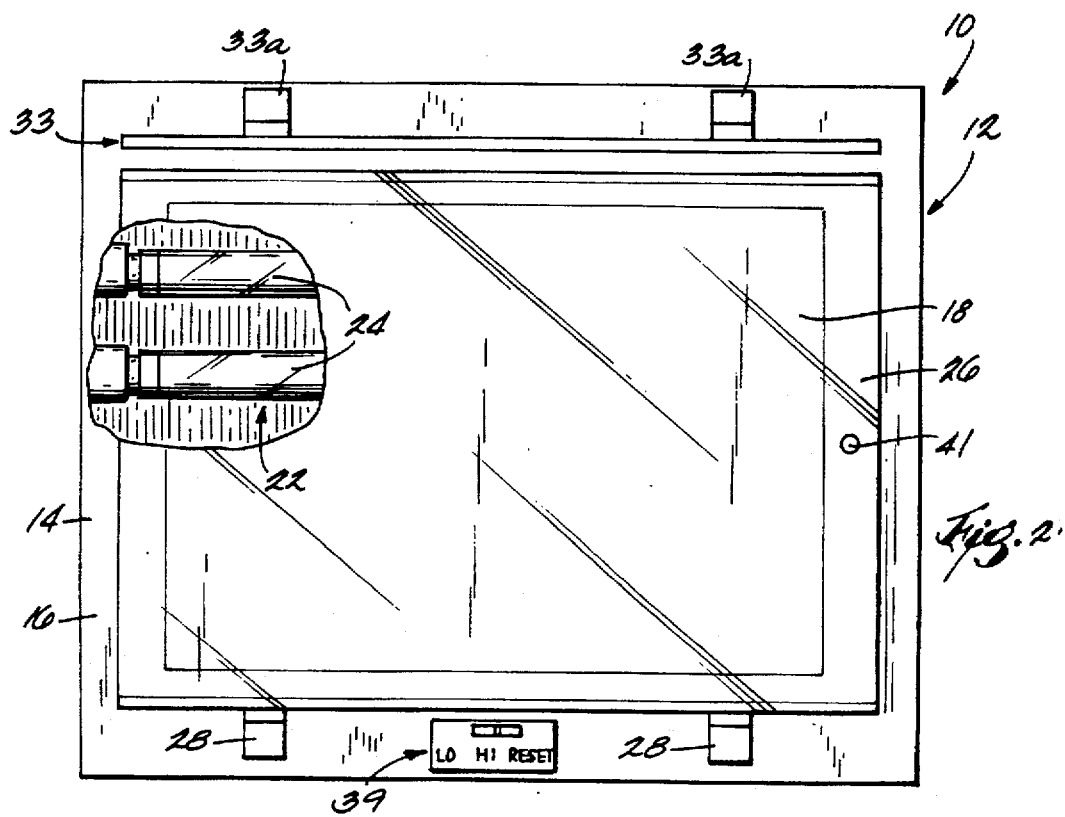
FIG. 2 is a top plan view of the dual transilluminator showing the blocking cover in its blocking position and the white light panel in its raised position.

The drawings illustrate a dual transilluminator 10 embodying the invention. As seen in FIG. 1, the dual transilluminator 10 generally comprises a housing 12 having a top wall 14 forming an upper surface 16. The top wall 14 has therein a UV-transmissible window 18 preferably made of a purple filter glass. As shown in FIG. 2, a first light source 22 is supported within the housing 12 for transmitting light through the window 18. The first light source 22 preferably provides UV light. The UV light source 22 preferably comprises one or more fluorescent lamps 24. A cooling fan (not shown) is preferably also incorporated within the housing to prevent thermal damage to the transilluminator components or to the various samples illuminated.

In the preferred embodiment, the transilluminator 10 includes a UV-blocking cover 26 designed to shield the user from UV radiation from the UV light source 22. The blocking cover 26 is made of an ultraviolet filtering material such as acrylic plastic. As shown, two hinges 28 pivotally connect the cover 26 to the housing 12 for movement of the cover between a blocking position (FIG. 2) and a non-blocking position (FIG. 1). With the cover 26 in the blocking position (FIG. 2), that is, flush against the housing 12, it is possible for a user to observe a sample being illuminated with the UV light source 22 without risk of harmful exposure to UV radiation.

Additionally, the transilluminator 10 comprises a second light source 33 providing light different than that of the light source 22. Preferably, the light source 33 provides white light. The light source 33 is preferably a thin, lightweight EL panel pivotally connected with hinges 33a to the housing 12 for movement of the EL panel 33 between a raised or vertical position (FIG. 2) and a lowered or horizontal position (FIG. 1). When the EL panel 33 is in the raised position, the window 18 is accessible. When the EL panel 33 is in the lowered position, the window 18 is inaccessible.

Figure 4:
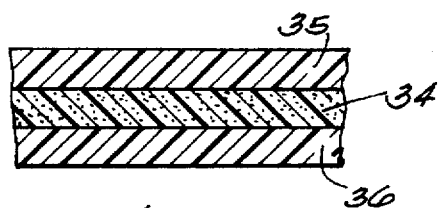
FIG. 4 is a partial sectional view of the white light panel.

In the illustrated construction, the panel 33 includes (see FIG. 4) a conventional EL lamp 34 (partially shown) sandwiched between upper and lower rigid plastic sheets 35 and 36, respectively (also partially shown in FIG. 4). The upper sheet 35, through which the EL lamp 34 illuminates a sample, is opaque so as to even out or scatter the light from the EL lamp. This prevents the light from being "grainy", which is a common quality of EL light. The upper sheet 35 is preferably made of No. 2447 white acrylic. The lower sheet 36 is also preferably made of acrylic, but can be any color, such as black. When in the lowered position, the EL panel 33 has two perpendicular horizontal dimensions (a length and a width) and a vertical dimension (a thickness) substantially less than both the length and the width.

It should be understood that the light source 33 could have different wavelengths (including UV) and could be mounted on the housing in a different manner for movement relative to the window 18. For example, the light source 33 could slide relative to the housing 12. Also, the light source 33 could be a different type of thin panel, such as a fiber optic weave.

Figure 3:
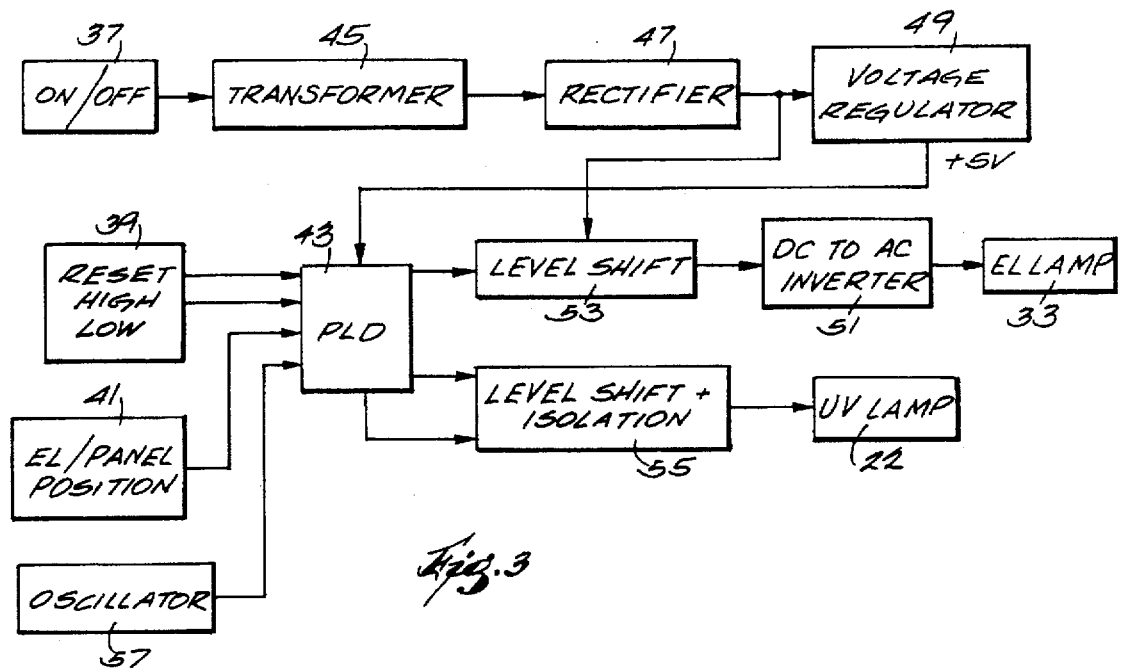
FIG. 3 is a block diagram of the control circuitry for the light sources.

A main power switch 37, a three position switch 39, and a panel position switch 41 are mounted on the housing 12 and constitute part of the control circuitry which provides power to the UV light source 22 and the EL panel 33. Additionally, the control circuitry includes (see FIG. 3) a programmable logic device (PLD) 43, a transformer 45, a rectifier 47, a voltage regulator 49, a DC to AC inverter 51, a level shifting circuit 53 and a level shifting and isolation circuit 55.

The main power switch 37 has on and off positions, and when off, both light sources are off. In the preferred embodiment, the main power switch is connected in series with the AC power line. The transformer 45 and the rectifier 47 convert the line voltage from an AC voltage to a DC voltage. The voltage regulator 49 takes the voltage output from the rectifier 47 and converts it to 5 Volts to power the digital circuitry, such as the PLD 43.

The panel position switch 41 indicates to the PLD 43 the position of the EL panel 33, i.e., whether the EL panel 33 is in its raised or lowered position. As shown in FIGS. 1 and 2, the panel position switch 41 has a plunger or actuator which normally extends upwardly from the upper surface 16 of the housing 12 and which is pushed down by the EL panel 33 when the panel 33 is lowered. Preferably, the panel position switch 41 is connected to the PLD 43 through a typical debounce circuit (not shown), and based on the position of the EL panel 33, either a logical "1" or a logical "0" is input to the PLD.

The three position switch 39 has high and low positions, which indicate the desired intensity of the UV light source 22 after a predetermined delay, and also a temporary reset position. The three position switch 39 is preferably of the single pole double throw type, although various other switch implementations are possible. The three position switch 39 is located on the upper surface 16 of the housing 12 so as to be inaccessible when the blocking cover 26 is in the raised position. The three position switch 39 is connected to the PLD 43 through a typical debounce circuit (not shown) and indicates to the PLD 43 via two input lines whether the three position switch is set to high, low, or reset.

In the preferred embodiment, an oscillator 57 is also connected as an input to the PLD. The oscillator 57 has a frequency of approximately twenty Hz, and a counter in the PLD 43 uses this input to count up to calculate the predetermined delay. This delay represents a time delay after which the UV light source is switched from high to low intensity, as further described below.

Thus, the PLD 43 has four logic inputs and is programmed to provide three outputs. A first output is connected to level shifting circuitry 53 which feeds a DC to AC inverter 51 which has a 120 VAC, 400 Hz output for powering the EL panel 33. The other two outputs are level shifted and are isolated from the PLD 43 to develop control signals which provide power to the UV light source 22.

When the EL panel 33 is in its raised position, the main power switch 37 is turned on, and the three position switch 39 is in its high or low position, the UV light source 22 turns on. The UV light source 22 initially is powered on at high intensity, which is necessary to ignite the fluorescent lamps 24; however, if the three position switch 39 is in the low position, after the predetermined delay time, the UV light source 22 is set to a lower intensity.

The panel position switch 41 is activated when the EL panel 33 is moved to the lowered position. When the EL panel 33 is moved to the lowered position, the PLD 43 outputs control signals such that the EL panel 33 is turned on, and the UV light source 22 is turned off.

If the EL panel 33 is then brought to the raised position, the panel position switch 41 is deactivated, and the PLD 43 outputs a control signal to turn off the EL panel 33. The UV light source 22, however, does not automatically turn on again until the three position switch 39 is temporarily reset and then switched to high or low by the operator. At that point, the UV light source 22 turns on. The additional reset required before the UV light source 22 turns on protects a user from UV light before the blocking cover 26 can be placed in its blocking position, which must be done before the user can reset the three position switch 39.

The EL panel 33 can also be used as a stand-alone transilluminator. The power supply includes components similar to those used to power the EL panel 33 in the transilluminator 10.

What is claimed is:

1. A transilluminator comprising a housing having therein a window, a first light source supported within said housing for transmitting light through said window and illuminating a sample adjacent said window, and a second light source which is mounted outside said housing and which is movable between a first position wherein said second light source is removed from said window, and a second position wherein said second light source overlies said window for transmitting light onto a sample adjacent said second light source, and wherein said second light source is between the sample and said window.

2. A transilluminator as set forth in claim 1, wherein said window is UV-transmissible and said first light source is a UV light source.

3. A transilluminator as set forth in claim 1, wherein said second light source is plate-like, and in one position has two perpendicular horizontal dimensions and a vertical dimension, said vertical dimension being substantially less than each of said horizontal dimensions.

4. A transilluminator as set forth in claim 1, wherein said second light source is pivotally connected to said housing.

5. A transilluminator as set forth in claim 1, wherein said second light source moves between a raised position and a lowered position, such that said window is accessible when said second light source is in said raised position, and said second light source overlies said window and makes said window inaccessible when said second light source is in said lowered position.

6. A transilluminator as set forth in claim 1, wherein said second light source is an EL light source.

7. A transilluminator as set forth in claim 6, wherein said EL light source is pivotally connected to said housing for movement between a raised position and a lowered position.

8. A transilluminator as set forth in claim 7, wherein said EL light source is plate-like, and in said lowered position has two perpendicular horizontal dimensions and a vertical dimension, said vertical dimension being substantially less than each of said horizontal dimensions.

9. A transilluminator as set forth in claim 1, further comprising control means for providing power to said first and second light sources, said control means including a main power switch having on and off positions such that, when said main power switch is off, then said first and second light sources are off, when said main power switch is on, and said second light source is in said first position, then said first light source is on and said second light source is off, and when said main power switch is on, and said second light source is in said second position, then said first light source is off and said second light source is on.

10. A transilluminator as set forth in claim 9, wherein said window is UV-transmissible and said first light source is a UV light source.

11. A transilluminator as set forth in claim 9, wherein said second light source is an EL light source.

12. A transilluminator as set forth in claim 1, further comprising control means for providing power to said first and second light sources, said control means including a main power switch having on and off positions, and a three position switch having high, low, and reset positions such that, when said main power switch is off, then said first and second light sources are off, when said second light source is in said first position, said three position switch is in said high or low position, and said main power switch is on, then said first light source is on, the intensity of said first light source being greater when said three position switch is high than when said three position switch is low, when said main power switch is on and said second light source is in said first position, then said second light source is off, when said main power switch is on and said second light source is in said second position, then said second light source is on and said first light source is off, when said main power switch is on, said three position switch is high or low, and said second light source transitions from said second position to said first position, then said first light source is off until said three position switch is reset and then switched to high or low at which point said first light source is on.

13. A transilluminator as in claim 12, wherein said window is UV-transmissible and said first light source is a UV light source.

14. A transilluminator as in claim 12 wherein said second light source is an EL light source.

15. A transilluminator as in claim 1, further comprising control means for providing power to said light sources, said control means including a programmable logic device, a main power switch having on and off positions, a three position switch having high, low, and reset positions, and a panel position switch having first and second states, said panel position switch being in said first state when said second light source is in said first position, said panel position switch being in said second state when said second light source is in said second position, such that, when said main power switch is off, then said first light source and said second light source are off, when said panel position switch is in said first state, said three position switch is high or low, and said main power switch transitions from off to on, then said first light source transitions from off to on, the intensity of said first light source being greater when said three position switch is high than when said three position switch is low, when said main power switch is on and said panel position switch is in said first state, then said second light source is off, when said main power switch is on and said panel position switch is in said second position, then said second light source is on and said first light source is off, when said main power switch is on, said three position switch is high or low, and said panel position switch transitions from said second state to said first state, said first light source is off until said three position switch is reset and then switched to high or low at which point said first light source is on.

16. A transilluminator as in claim 15, wherein said window is UV-transmissible and said first light source is a UV light source.

17. A transilluminator as in claim 15 wherein said second light source is an EL light source.

18. A transilluminator as set forth in claim 1, wherein said first light source is a UV light source, wherein said transilluminator also comprises a UV-blocking cover movable between a blocking position over said window and a non-blocking position providing access to said window, and control means for providing power to said light sources, said control means including a reset switch such that, when said second light source moves from said second position to said first position, said first light source is off until said reset switch is activated by the operator, said reset switch being located on said housing such that said reset switch is accessible only when said blocking cover is in said blocking position.

19. A transilluminator as set forth in claim 1 wherein said second light source is connected directly to said housing.

20. A transilluminator comprising
a housing having therein a UV-transmissible window;
a first, UV light source supported within said housing for transmitting light through said window and illuminating a sample adjacent said window; and
a second, EL light source which is mounted outside said housing and which is movable between a first position wherein said second light source is removed from said window, and a second position wherein said second light source overlies said window for transmitting light onto a sample adjacent said second light source, and wherein said second light source is between the sample and said window.

21. A transilluminator as set forth in claim 20, further comprising control means for providing power to said first and second light sources, said control means including a main power switch having on and off positions such that, when said main power switch is off, then said first and second light sources are off, when said main power switch is on, and said second light source is in said first position, then said first light source is on and said second light source is off, and when said main power switch is on, and said second light source is in said second position, then said first light source is off and said second light source is on.

22. A transilluminator as set forth in claim 20, further comprising control means for providing power to said first and second light sources, said control means including a main power switch having on and off positions, and a three position switch having high, low, and reset positions such that, when said main power switch is off, then said first and second light sources are off, when said second light source is in said first position, said three position switch is in said high or low position, and said main power switch is on, then said first light source is on, the intensity of said first light source being greater when said three position switch is high than when said three position switch is low, when said main power switch is on and said second light source is in said first position, then said second light source is off, when said main power switch is on and said second light source is in said second position, then said second light source is on and said first light source is off, when said main power switch is on, said three position switch is high or low, and said second light source transitions from said second position to said first position, then said first light source is off until said three position switch is reset and then switched to high or low at which point said first light source is on.

23. A transilluminator as in claim 20, further comprising control means for providing power to said light sources, said control means including a programmable logic device, a main power switch having on and off positions, a three position switch having high, low, and reset positions, and a panel position switch having first and second states, said panel position switch being in said first state when said second light source is in said first position, said panel position switch being in said second state when said second light source is in said second position, such that, when said main power switch is off, then said first light source and said second light source are off, when said panel position switch is in said first state, said three position switch is high or low, and said main power switch transitions from off to on, then said first light source transitions from off to on, the intensity of said first light source being greater when said three position switch is high than when said three position switch is low, when said main power switch is on and said panel position switch is in said first state, then said second light source is off, when said main power switch is on and said panel position switch is in said second state, then said second light source is on and said first light source is off, when said main power switch is on, said three position switch is high or low, and said panel position switch transitions from said second state to said first state, said first light source is off until said three position switch is reset and then switched to high or low at which point said first light source is on.

24. A transilluminator as set forth in claim 20, wherein said second light source is plate-like, and in one position has two perpendicular horizontal dimensions and a vertical dimension, said vertical dimension being substantially less than each of said horizontal dimensions.

25. A transilluminator as set forth in claim 20, wherein said EL light source is pivotally connected to said housing for movement between a raised position and a lowered position.

26. A transilluminator as set forth in claim 20 wherein said second light source is connected directly to said housing.

27. A method of transilluminating a laboratory sample, said method comprising the steps of
providing a transilluminator comprising a housing having therein a window, and a light source supported within said housing for transmitting light through said window and for illuminating a sample on said window,
providing an EL light panel and placing said panel over said window,
placing the sample on said panel, and
providing electrical power to said panel so that said panel transilluminates the sample.

* * * * *